Sept. 30, 1952     W. F. GROENE     2,612,069
ORBITAL LATHE TOOL FEEDING MECHANISM
Filed Sept. 5, 1950     3 Sheets-Sheet 1
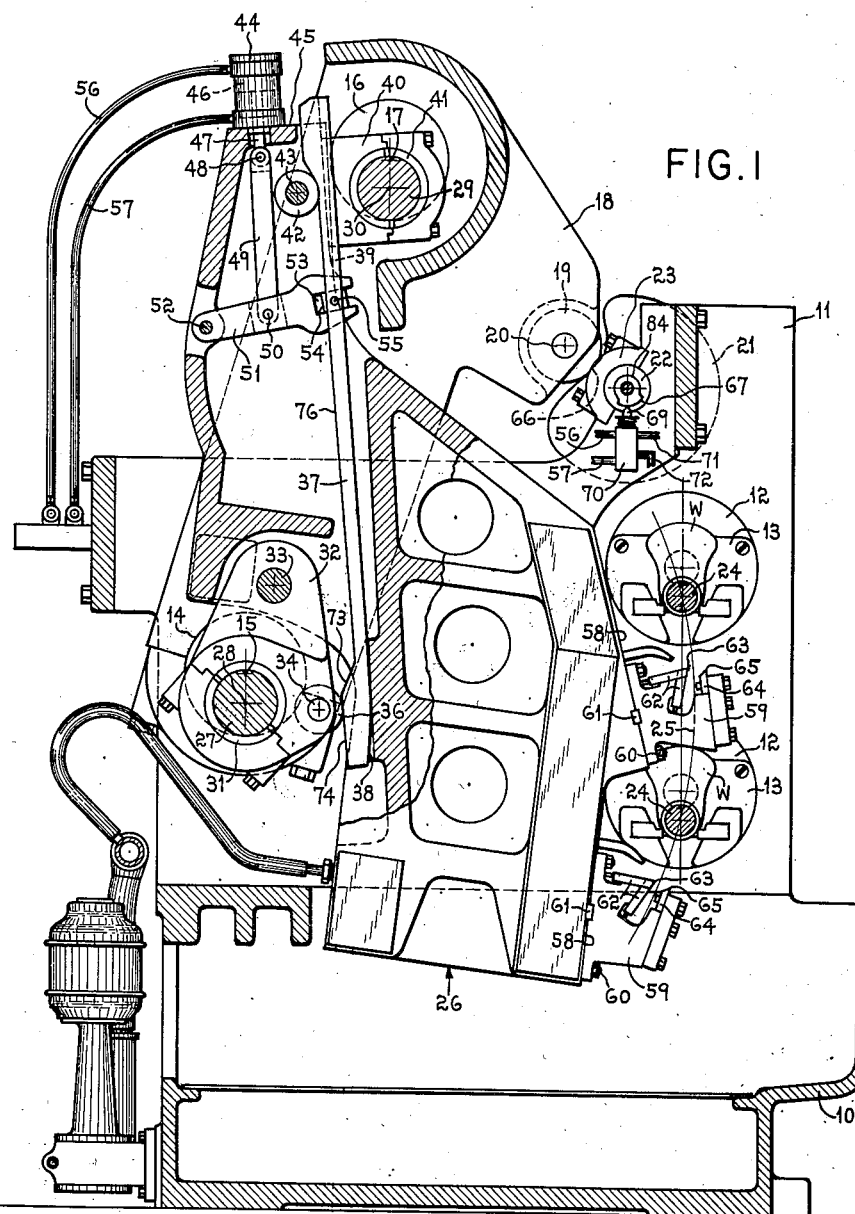
INVENTOR.
WILLIAM F. GROENE
BY
ATTORNEY.

Sept. 30, 1952   W. F. GROENE   2,612,069
ORBITAL LATHE TOOL FEEDING MECHANISM
Filed Sept. 5, 1950   3 Sheets-Sheet 2
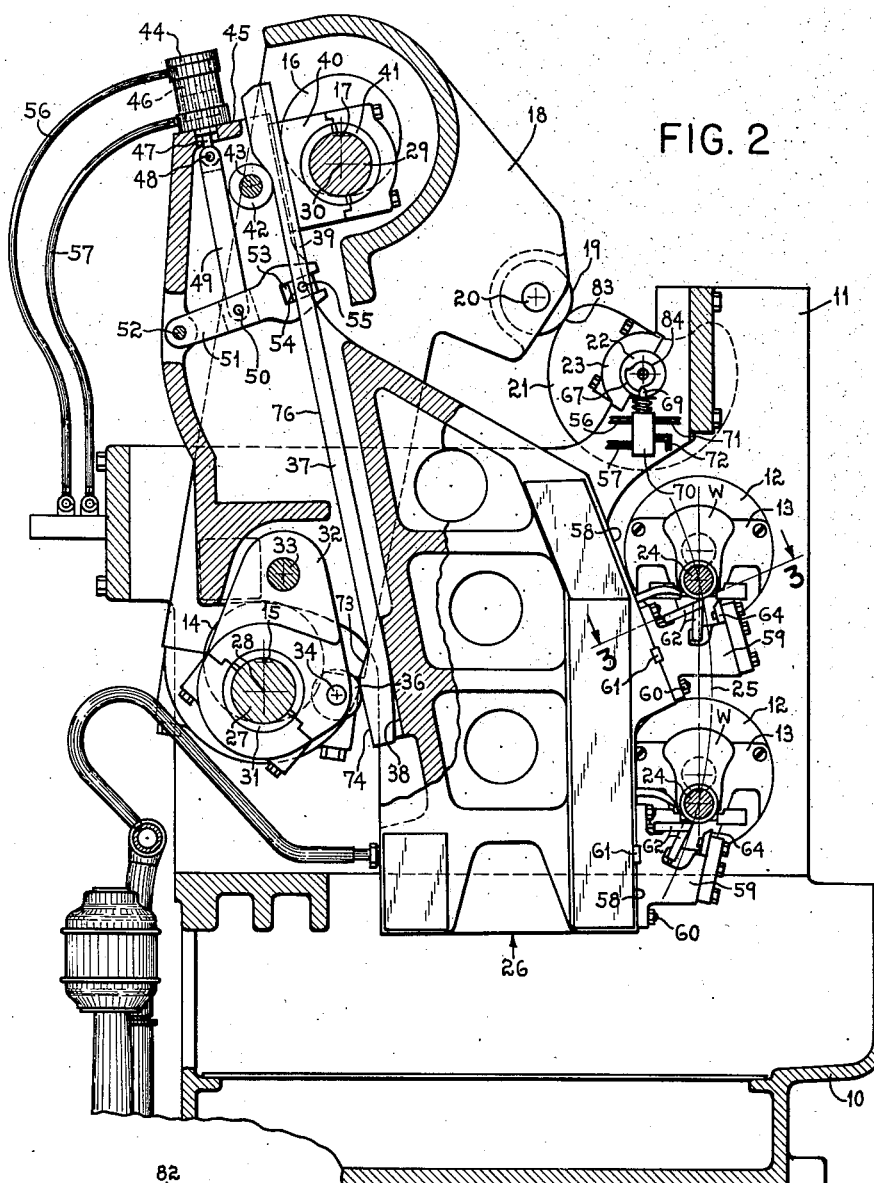
INVENTOR.
WILLIAM F. GROENE
BY
ATTORNEY.

Sept. 30, 1952     W. F. GROENE     2,612,069
ORBITAL LATHE TOOL FEEDING MECHANISM
Filed Sept. 5, 1950     3 Sheets-Sheet 3
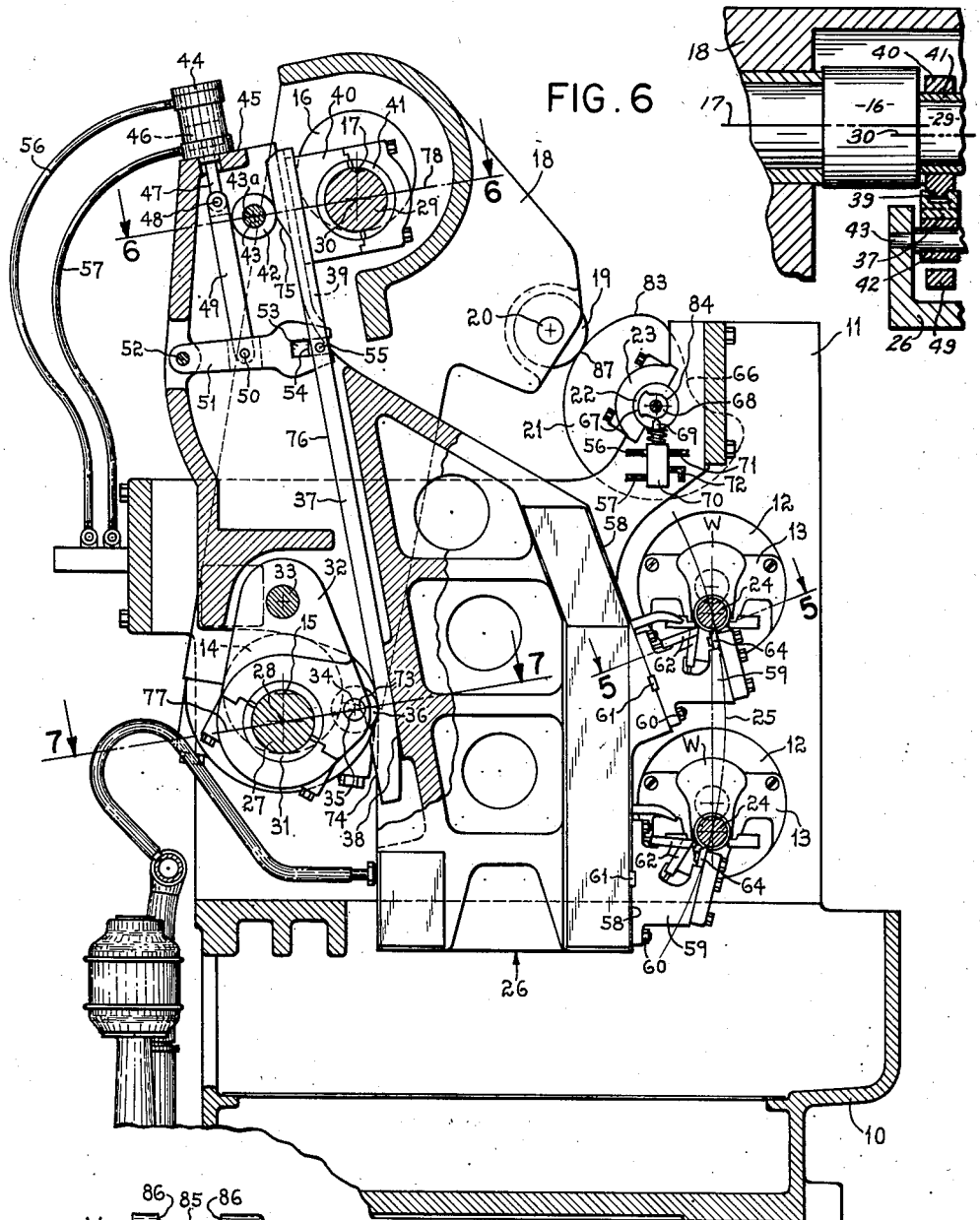
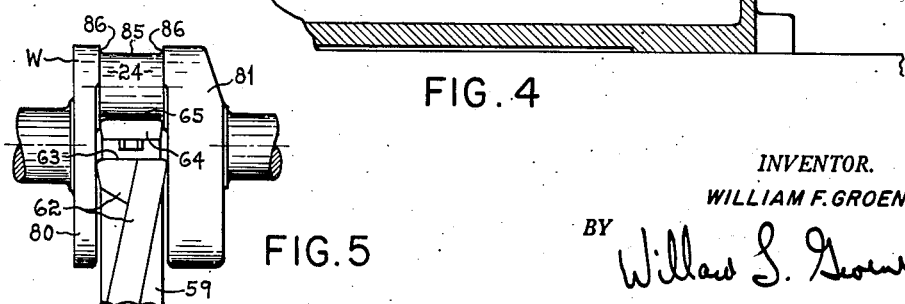
INVENTOR.
WILLIAM F. GROENE
BY
ATTORNEY.

Patented Sept. 30, 1952

2,612,069

UNITED STATES PATENT OFFICE 2,612,069

ORBITAL LATHE TOOL FEEDING MECHANISM

William F. Groene, Cincinnati, Ohio, assignor to The R. K. Le Blond Machine Tool Company, Cincinnati, Ohio, a corporation of Delaware Application September 5, 1950, Serial No. 183,205

7 Claims. (Cl. 82—9)

1

This invention pertains to orbital lathe tool feeding mechanism and is particularly directed to improvements in tool feeding mechanisms for crankpin turning lathes. More particularly, this invention pertains to improvements in tool feeding mechanisms for lathes such as shown in Patent 2,138,964, issued December 6, 1938.

One of the objects of this invention is to provide an improved tool feeding mechanism for a lathe capable of successively presenting a roughing tool and then a finishing tool to a workpiece to be machined in the lathe during a continuous feeding movement of the tool carrier to the workpiece.

Another object of this invention is to provide an improved tool feeding mechanism for an orbital crankpin turning lathe wherein the orbitally moving tool carrier is bodily moved relative to the master crankpin axes to effect a presentation of different sets of cutting tools in cutting position relative to the workpiece in the lathe.

Still another object of this invention is to provide an improved tool feeding mechanism for an orbital crankpin turning lathe in which the orbital tool carrying unit is moved bodily in a straight line rectilinear movement relative to the axes of the master crankpins carrying the orbital tool carrier so as to successively present roughing tools and then finishing tools to workpieces in the lathe.

Still another object of this invention is to provide an improved tool carrier structure for an orbital lathe in which the tool carrier may be bodily adjusted relative to the master crankpins upon which it is carried so as to present different sets of cutting tools in cutting position during a continuous infeeding movement of the tool carrier relative to the work spindles of the lathe.

Further features and advantages of this invention will appear from a detailed description of the drawings in which:

Figure 1 is an elevation partly in section through an orbital crankpin turning lathe showing the improved feed mechanism having the features of this invention, showing the cutting tools and orbital tool carrier at the beginning of a cutting cycle.

Figure 2 is a view similar to Figure 1 but showing the cutting tools in position at the completion of the roughing operation.

Figure 3 is an enlarged fragmenary view on the line 3—3 of Figure 2.

Figure 4 is a view similar to Figures 1 and 2 but showing the position of the finishing tools at the completion of the cutting cycle.

2

Figure 5 is an enlarged fragmentary view on the line 5—5 of Figure 4.

Figure 6 is a fragmentary section on the line 6—6 of Fig. 4.

Fig. 7 is a fragmentary section on the line 7—7 of Fig. 4.

For illustrative purposes this invention is shown applied to a conventional multiple spindle orbital crankpin turning lathe such as shown in the above cited Patent No. 2,138,964. Such a machine comprises a base 10 upon which are mounted the upright work spindle carrying houses 11 in which are journaled the work spindles 12 which in turn carry the chucking devices 13 for gripping and rotating the workpieces or crankshafts W the work rotating chucks 13 and work spindles 12 are geared to rotate in synchronism with the lower master crankshaft 14 journaled for rotation about the axis 15 in suitable bearings in the rear portion of the housings 11 and with the upper master crankshafts 16 suitably journaled for rotation about the axis 17 in the feeding cradle 18 in a manner as fully disclosed in the aforementioned Patent 2,138,964.

The feeding cradle 18 is pivotally mounted on suitable bearings in the housings 11 for rocking motion about the axis 15 of the lower master crankshaft 14 and has a cam roller 19 journaled on a pin 20 fixed in the cradle 18, the roller 19 engaging the feed cam 21 which is carried on a suitable feed shaft 22 journaled in suitable bearings 23 carried in the upper front portions of the housings 11 as fully described in said recited patent. Suitable fluid pressure means as also disclosed in this patent, are provided for rotating the shaft 22 and the cam 21 to effect the desired rate and feed movement for the cradle 18 to cause cutting tools to move to and from the crankpins 24 to be machined on the workpieces W, following along the line of arcuate feeding motion 25.

Each of the tool carrier units 26 of the orbital crankpin turning lathe are carried in orbital motion upon the crankpin 27 having the axis 28 of the lower master crankshaft 14 and on the crankpin 29 having the axis 30 of the upper master crankshaft 16. Journaled on a suitable bearing 31 on the crankpin 27 of the lower master crankshaft is the tool carrier supporting link 32 which extends upwardly and is pivotally connected by means of a pin 33 with the tool carrier 26. Journaled on a pin 34 for rotation about an axis 35 is the lower cam roller 36 which engages the reciprocatable cam bar 37 slidably engaging suitable guide ways 38 in the tool carrier 26.

The upper portion of the cam bar 37 has a suitable guide way 39 in which is slidably supported the journal bearing box 40 having a bearing 41 journaled on the crankpin 29 of the upper master crankshaft 16. An upper cam roller 42 is journaled on a pin 43 fixed in the upper portion of the tool carrier 26 and also engages the cam bar 37.

The cam bar 37 is reciprocatable in the guide ways 38 and 39 by means of a fluid pressure cylinder 44 fixed to the top surface 45 of the tool carrier 26. This cylinder has a piston 46 connected to a piston rod 47 which in turn is connected to a pivot pin 48 to a link 49 which is in turn pivotally connected through a pin 50 to the toggle arm 51. This toggle arm 51 is pivotally mounted at its rear end on a pin 52 fixed to the tool carrier 26 and has a bifurcated slotted end 53 in which is slidably carried the swivel block 54 which in turn is pivotally connected through a suitable pin 55 to the cam bar 37. Thus by the application of fluid pressure through the supply lines 56 and 57 connected to the cylinder 44 the cam bar 37 may be reciprocated.

On the front faces 58 of the tool carrier unit 26 are mounted the tool blocks 59 which are secured to the tool carrier 26 by suitable bolts 60 and keys 61. Each of the tool blocks 59 carry the two sets of cutting tools, the roughing tools 62 having the effective cutting edge 63 and the finishing tool 64 having the effective cutting edge 65.

The operation of the tool feeding mechanism is as follows:

At the beginning of the cutting cycle the cradle 18 has swung to fully forward position around the axis 15 of the lower master crankshaft with the roller 19 engaging the portion 66 of the feed cam 21 so that the tool blocks 59 and their respective tools are in fully withdrawn downward position away from the crankpins 24 on the workpieces W to be machined. At the same time the high portion 67 of the control cam 68 fixed to the feed shaft 22 engages the spring urged plunger 69 of the fluid pressure control valve 70 so as to apply fluid pressure from the pressure supply line 71 to the line 57 to hold the piston 46 of the cylinder 44 in upper position while discharge from the cylinder 44 is connected from the line 56 to the discharge line 72 from the valve 70. Under these conditions the cam bar 37 is held in upward position causing the roller 36 to ride up the surface 73 of the cam bar and remain on the high portion 74 of this cam bar. At the same time the roller 42 rides down the angular cam surface 75 of the cam bar 37 and to remain on the lower cam surface 76 of this cam bar. This causes the tool carrier to be moved to forward or roughing tool position by effecting relative bodily movement of the tool carrier along the lines 77 and 78 passing respectively through the axes of the lower master crankshaft crankpin 27 and the axis 35 of the roller 36 and the axis 30 of the crankpin 29 of the upper master crankshaft and the axis 43a of the pin 43. Thus the tool carrier moves parallel to itself or in rectilinear straight line movement parallel to the lines 77 and 78 relative to the crankpins 27 and 29 of the respective master crankshaft.

Under these conditions the effective cutting edges 63 of the roughing tools 62 are maintained in the arcuate line 25 of feeding movement to effect the cheeking or roughing cut operation on the webs 80 and 81 and to rough out the crankpin portions 82 of the work crankshaft W as best shown in Figure 3. With the tool carrier 26 thus in roughing cut position the roughing tools 62 continue their cutting operation upon rotation of the cam 21 until the cam roller 19 of the cradle 18 arrives at the point 83 on the feed cam 21 so as to bring the roughing tools down to completed position shown in Figure 3. At this time the plunger 69 of the control valve 70 drops to the lower portion 84 of the control cam 68 so as to now connect fluid pressure from the line 71 to the line 56 and to connect the discharge line 72 to the line 57 to cause the fluid pressure cylinder to shift the cam bar 37 downwardly as shown in Figure 4. In Figure 2 is shown the condition of the tool carrier and cutting tools at the instant of making the aforementioned shift from the roughing position of the cutting tool 62 to the finishing position of bringing the cutting edges 65 of the finishing tools 64 into position. Thus shifting the cam bar 37 downwardly repositions the tool carrier rearwardly along the lines 77 and 78 as described to now bring the cutting edges 65 of the finishing tools 64 into the arcuate line of feeding movement 25 so that these tools may now perform their cutting operation to complete the turning of the crankpin portion 85 and the fillet walls 86 associated therewith. During the time the finishing tools 64 are in cutting position the cam 21 continues to rotate to finally bring the roller 19 of the cradle 18 to the relative position on the cam 21 indicated at 87, thus completing the entire cutting cycle of the machine. The cam 21 is then reversed rapidly in rapid traverse movement to bring the cradle back to the position shown in Figure 1 and to also reposition the control valve 70 so as to again shift the cradle to forward or roughing tool position preparatory to begin another cutting cycle.

Having thus fully described this invention and its numerous attendant advantages, it is obvious that many changes may be made in the form, construction and arrangement of the parts without departing from the spirit or scope of the invention or sacrificing its attendant advantages, the form herein described being a preferred embodiment for the purposes of exemplifying this invention.

What is claimed is:

1. In a tool feeding mechanism for an orbital lathe having a pair of master crankshafts, an orbital tool carrier, cutting tools fixed on said tool carrier, a link pivotally interconnecting said tool carrier with a crank pin of one of said master crankshafts, a cam bar slidably mounted in and supporting said tool carrier, a cam roller journaled on said link and engaging said cam bar, a second cam roller journaled on said carrier and engaging said cam bar at another spaced position, a bearing box journaled on a crank pin of said other master crankshaft and supportingly connected to said cam bar, and power means for longitudinally reciprocating said cam bar to cause a relative displacement of said tool carrier and said crank pins of said master crankshafts including a connection between said cam bar and a crank pin of said upper master crankshaft.

2. In an orbital lathe having a pair of master crankshafts, an orbitally moving tool carrier, cutting tools fixed on said tool carrier, a link interconnecting said carrier with one of the crank pins of one of said master crankshafts, a slidable cam bar in said tool carrier, means including a cam roller interconnecting said cam bar with said link, means including a journal box interconnecting another portion of said cam bar with a crank pin of said other master crankshaft, and a cam roller journaled on said carrier engaging said cam bar, and means on said carrier for longitudinally reciprocating said cam bar to effect relative bodily straight line displacement of said carrier relative to said master crankshafts.

3. In an orbital lathe tool feeding mechanism comprising a frame, a first master crankshaft journaled in said frame, a feeding cradle pivotally mounted on said frame for rocking movement about the line bearing axis of said master crankshaft, a second master crankshaft journaled in said cradle, means for actuating said cradle in said rocking movement, an orbitally moving tool carrier, a tool block fixed on said tool carrier, a first tool fixed on said tool block, a second tool fixed on said tool block in spaced relationsihp to said first tool, a link journaled at one end on a crank pin of said first master crankshaft and pivotally connected to said tool carrier, a cam bar reciprocatably mounted and guided in said tool carried, a cam roller journaled on said link and engaging one end of said cam bar, a second cam roller journaled on the upper end of said orbitally moving tool carrier and engaging the other end of said cam bar, a journal box journaled on a crank pin of said second master crankshaft, and means connecting said journal box in supporting relationship on the opposite side of said cam bar from said second mentioned cam roller, and power means on said tool carrier adapted to actuate said cam bar so as to present alternate high and low cam surfaces to said cam rollers on said link and tool carrier to effect straight line rectilinear shifting movement of said tool carrier relative to the axes of said master crankshafts to present either said first tool or said second tool to cutting position relative to a workpiece in said lathe.

4. In an orbital lathe tool feeding mechanism comprising a frame, a master crankshaft journaled in said frame, a feeding cradle pivotally mounted on said frame for rocking movement about the line bearing axis of said master crankshaft, a second master crankshaft journaled in said cradle, means for actuating said cradle in said rocking movement, an orbitally moving tool carrier, a tool block fixed on said tool carrier, a first tool fixed on said tool block, a second tool fixed on said tool block in spaced relationship to said first tool, a link journaled at one end on a crank pin of said first master crankshaft and pivotally connected to said tool carrier, a cam bar reciprocatably mounted and guided in said tool carrier, a cam roller journaled on said link and engaging one end of said cam bar, a second cam roller journaled on the upper end of said orbitally moving tool carrier and engaging the other end of said cam bar, a journal box journaled on a crank pin of said second master crankshaft, and means connecting said journal box in supporting relationship on the opposite side of said cam bar from said second mentioned cam roller, and power means on said tool carrier adapted to actuate said cam bar so as to present alternate high and low cam surfaces to said cam rollers on said link and tool carrier to effect straight line rectilinear shifting movement of said tool carrier relative to the axes of said master crankshafts to present either said first tool or said second tool to cutting position relative to a workpiece in said lathe, and control means operating in timed relationship to the feeding movement of said cradle to energize said power means for actuating said cam bar.

5. In an orbital lathe tool feeding mechanism including an orbital tool carrier, a pair of master crankshafts, means for supporting said orbital tool carrier on a crank pin of each of said master crankshafts, means for bodily shifting said tool carrier relative to the axes of rotation of both of said master crankshafts including a device for moving one portion of said tool carrier away from the axis of one of said master crankshafts while moving another portion of said tool carrier toward the axes of the other master crankshaft in straight line rectilinear movement, and means for actuating said tool carrier in arcuate movement in a direction angularly related to said direction of straight line rectilinear movement.

6. In an orbital lathe tool feeding mechanism including an orbital tool carrier, a pair of master crankshafts, means for supporting said orbital tool carrier on a crank pin of each of said master crankshafts, comprising means for bodily shifting said tool carrier relative to said master crankshafts including a device for moving one portion of said tool carrier away from the axis of rotation of one of said master crankshafts while moving another portion of said tool carrier toward the axis of rotation of the other master crankshaft in a straight line rectilinear movement, and means for actuating said tool carrier in a feeding direction angularly related to said direction of straight line rectilinear movement, said means for effecting said straight line movement comprising a cam bar located on one side of said one master crankshaft and on the opposite side of said other master crankshaft and extending diagonally substantially through the center portion of said tool carrier, power means mounted on said tool carrier for reciprocating said cam bar, and control means for a source of fluid pressure applicatable to said power means actuated by the relative feeding position of said tool carrier.

7. In an orbital lathe tool feeding and positioning mechanism, a frame, a first master crankshaft journaled in said frame, a crankpin on said first master crankshaft, a feeding cradle journaled for rocking movement on said frame, a second master crankshaft journaled in said cradle, a crankpin on said second master crankshaft, an orbitally moving tool carrier, a link, a pivotal connection between said tool carrier and said link, means for journaling said link on the crankpin of said first master crankshaft, a journal box on the crankpin of said second master crankshaft, a cam bar, means for slidingly supporting said cam bar on said journal box, means for slidingly supporting said orbitally moving tool carrier on said cam bar, means interconnecting said link and said cam bar, a tool block fixed on said orbitally moving tool carrier, and a pair of tools fixed on said tool block at predetermined spaced positions thereon.

WILLIAM F. GROENE.

REFERENCES CITED

The following references are of record in the file of this patent:

UNITED STATES PATENTS

| Number | Name | Date |
|---|---|---|
| 2,138,964 | Groene | Dec. 6, 1938 |
| 2,148,293 | Groene | Feb. 21, 1939 |
| 2,173,609 | Groene | Sept. 19, 1939 |
| 2,184,591 | Groene | Dec. 26, 1939 |